United States Patent [19]
Wicks et al.

[11] Patent Number: 5,423,349
[45] Date of Patent: Jun. 13, 1995

[54] DIVERTING FLUID FLOW

[75] Inventors: Jeffrey R. Wicks, Reading; Brian N. Goodall, Newbury, both of Great Britain

[73] Assignee: Plenty Limited, United Kingdom

[21] Appl. No.: 245,871

[22] Filed: May 19, 1994

[30] Foreign Application Priority Data

Mar. 20, 1993 [GB] United Kingdom ............... 9310397

[51] Int. Cl.⁶ .................................................. F16K 11/00
[52] U.S. Cl. .................................. 137/595; 137/625.44
[58] Field of Search .............. 137/595, 625.44, 625.45, 137/875, 876

[56] References Cited

U.S. PATENT DOCUMENTS

| | | | |
|---|---|---|---|
| 3,595,270 | 7/1971 | McNeal, Jr. | 137/595 |
| 4,080,990 | 3/1978 | DeBenedetti | 137/625.44 X |
| 5,211,195 | 5/1993 | Hanos | 137/625.44 X |

FOREIGN PATENT DOCUMENTS 2710844  9/1978  Germany .

*Primary Examiner*—John C. Fox
*Attorney, Agent, or Firm*—Wood, Herron & Evans

[57] ABSTRACT

A three-way diverter valve comprising a rotatable valve member to which are mounted a number of sealing faces, each face being adapted to seal against one of the inlet or outlet of one of the paths the member being movable between a first position in which both the inlet and outlet of a first path are sealed, and both the inlet and outlet of the second path are open for fluid to flow therethrough, and a second position in which both the inlet and outlet of the first path are open for fluid to flow therethrough and both the inlet and outlet of the second path are sealed, movement of the member effecting sealing or opening of the inlet and outlet of each flow path substantially simultaneously, both paths being at least partially open for fluid to flow therethrough when the member is between the first and second positions.

10 Claims, 4 Drawing Sheets

DIVERTING FLUID FLOW

This invention relates to an apparatus for diverting the flow of a fluid between at least two paths.

It is often necessary to divert the flow of fluid from a path passing through one process station to another path which passes through another process station. For example, where the fluid flow passes through a filter, it is frequently necessary to divert the fluid flow along a different path containing another filter, so that the first filter may be exchanged or cleaned. In such a system it will eventually become necessary to divert the fluid flow again, so that the second filter may be exchanged or replaced. Alternatively, the fluid flow may be diverted between two paths in which different processes are carried out on the fluid flowing therethrough.

In known liquid filtration systems, for example, two parallel liquid flow paths are provided each containing a filter, and having a diverter valve at both the inlet of the two paths and also at the outlets of the two paths. The flow of liquid is diverted between the two paths by operating the two diverter valves so as to close the inlet and outlet of one of the paths and halt the liquid flow therethrough and to open the inlet and outlet of the other path.

The provision of two separate diverter valves is expensive and, in order that there be no interruption in the flow of liquid through the system whilst the flow is diverted between the two paths, either expensive control means must be provided so that the two diverter valves operate simultaneously, or the operator must take great care so as to ensure that both valves operate simultaneously. Where, as is often the case, the diverter valves are not manually operable, there are considerable problems in ensuring simultaneous operation of the two valves.

In accordance with the present invention, an apparatus for diverting the flow of a fluid between two paths comprises a rotatable member to which are mounted a number of sealing faces, each adapted to seal against one of the inlet or outlet of one of the paths, the member being movable between a first position in which both the inlet and outlet of a first path are sealed, and both the inlet and outlet of the second path are open for fluid to flow therethrough, and a second position in which both the inlet and outlet of the first path are open for fluid to flow therethrough and both the inlet and outlet of the second part are sealed, movement of the member effecting sealing or opening of the inlet and outlet of each flow path substantially simultaneously, both paths being at least partially open for fluid to flow therethrough when the member is between the first and second positions.

With such an arrangement, the sealing or opening of both the inlet and outlet of each of the paths is effected simultaneously by the movement of a single member; simultaneous sealing and opening may be achieved whether the member is moved manually or otherwise and without the necessity of complex and/or expensive control means. Furthermore, because both paths are at least partially open for fluid to flow therethrough whilst the member is moved so as to seal one path and to open the other path there is no interruption in the flow of fluid through the apparatus during the course of this movement.

The member comprises a pivotable member carrying a number of sealing faces, each adapted to seal against one of the inlet or outlet of one of the paths, the arrangement being such that the member may be pivoted between two positions in each of which one of the paths is open for fluid to flow therethrough and the other path is sealed and fluid is able to flow through both paths whilst the member is pivoted from one position to the other.

Where the fluid is at a pressure greater than atmospheric pressure and the pressure in the sealed path is relieved for any reason, so as to clean or exchange a filter in that path, for example, then the fluid pressure serves to improve the seal between the inlet and outlet of the sealed path and the respective sealing faces.

Alternatively, where the fluid is at a pressure lower than atmospheric pressure and the pressure in the sealed path is increased to atmospheric pressure, so as to clean or exchange a filter in that path, the seal between the inlet and outlet of the sealed path is enhanced by the pressure differential acting in the opposite direction.

The pivotable member may be mounted within a cylindrical housing with its pivot axis parallel to, but not coincident with, the longitudinal axis of the housing, the inlet and outlet to each path comprising a port formed in the wall of the housing, each sealing face comprising a section of a cylindrical surface and having a radius substantially equal to the radius of the housing.

Such an arrangement is robust, easy to operate and relatively inexpensive and easy to manufacture.

The longitudinal axes of the cylindrical sealing faces may be parallel to, but not coincident with, the axis of rotation of the pivotable member.

With such an arrangement, where the cylindrical sealing faces are eccentric with respect to the axis about which the member pivots, the sealing face does not come into contact with the housing wall until the seal face surrounds the port. At the point of contact, the sealing face slides relative to the housing wall, and this sliding motion wipes clean any debris from the mating surfaces to provide a good seal therebetween. Furthermore, when the member is rotated away from one or other of the sealing positions the clearance between the housing and the sealing faces increases, thereby avoiding any interruption to the flow of fluid through the system.

The seal between each sealing face and the respective inlet or outlet port may be improved by providing a soft seal seated in a groove either around the port or around the periphery of the sealing face. The effect of the sliding motion as each sealing face comes into contact with the respective inlet or outlet port is both to wipe clean the contact surface therebetween and also to squeeze the soft seal so as to improve the sealing effect. The soft seal is preferably an 'O' ring seal of a rubber compound or of bonded design.

Preferably the pivotable member is mounted within a cylindrical housing on coaxial stub shafts extending through the housing. With such stub shafts, when fluid flows through the apparatus under pressure, the pivotable member is balanced along its longitudinal axis, so that there is no need to provide thrust bearings to restrain the movement of the member along that axis.

Means may be provided to relieve the fluid pressure within each path when the inlet and outlet thereto is sealed. Once the fluid pressure in one of the paths is relieved, the fluid pressure within the other paths of the apparatus acts on the reverse side of the sealed sealing faces to provide a pressure lock, preventing any movement of the pivotable member until the fluid pressure is restored in the sealed path.

The fluid may be either a liquid or a gas, and means may be provided to refill each sealed path with the appropriate fluid. Where the fluid is a gas, additional means may be provided to purge the sealed path of contaminants before the sealed path is opened once more by pivoting the member.

With apparatus in accordance with the invention, it is possible to provide at least 3-way fluid flow (that is, flow through either of the two paths, or through both paths simultaneously) without porting in the valve apparatus, without interrupting fluid flow during changeover and with no limitation on the number of such 3-way valves which may be operated in series.

There is no limitation as to the materials of construction, nor as to the shape or size of the various inlets and outlets.

The invention will now be described by way of example with reference to the accompanying drawings, in which.

Figure 1A:
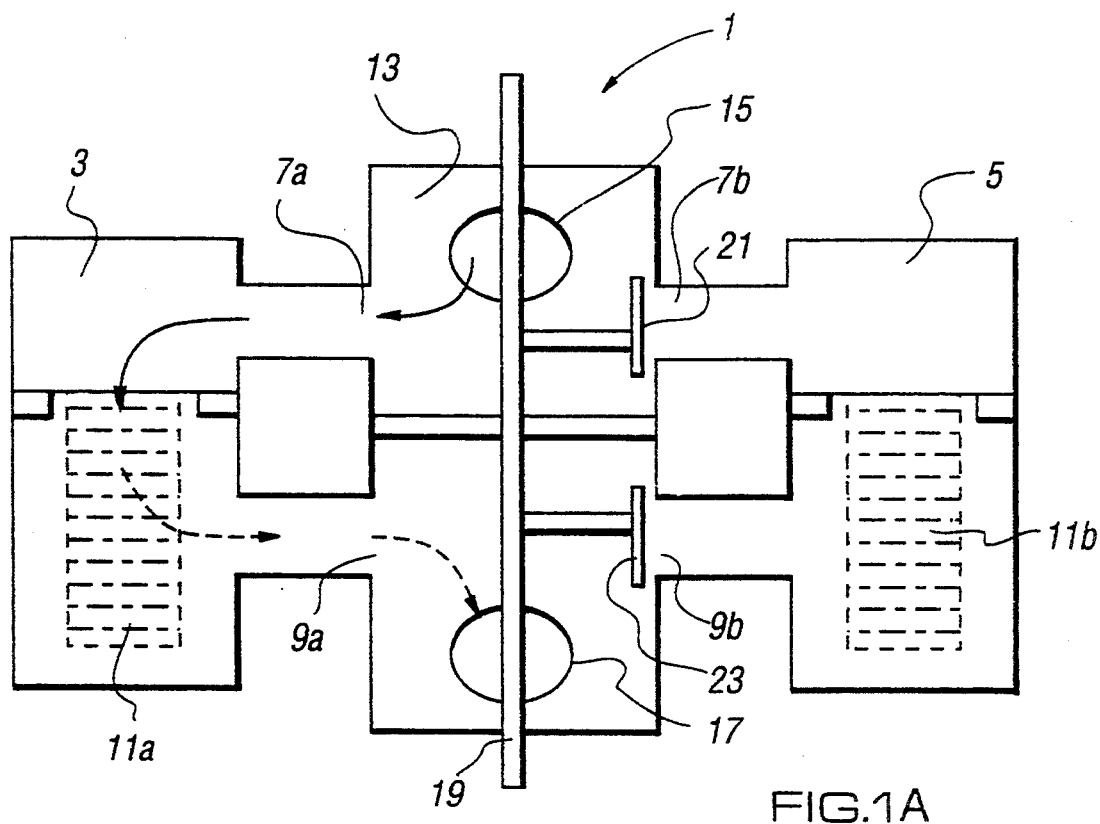
FIG. 1A is a schematic elevation view of an apparatus in accordance with the invention in a first sealing position.

The apparatus 1 shown schematically in FIGS. 1A, 1B, 2A and 2B is a 3-way diverter valve for controlling the liquid flow in a duplex strainer. Two chambers 3 and 5 are connected in parallel, having fluid inlets 7a and 7b and fluid outlets 9a and 9b respectively, and each containing a filter element 11a and 11b respectively, to a central chamber 13. Fluid enters the apparatus 1 through an inlet port 15 and exits the apparatus through an outlet port 17 having passed through one or both of the filter elements 11a and 11b, as described below. The flow of the fluid through the apparatus 1 is indicated by the arrows, the broken arrows indicating the flow of filtered fluid.

The central chamber 13 contains a pivotable member 19 to which are mounted inlet and outlet seals 21 and 23 respectively. Rotation of the member 19 about its central axis 31 moves the seals 21,23 into or out of sealing engagement with the inlet and outlet 7a, 9a, 7b, 9b of each of the chambers 3,5 substantially simultaneously.

Figure 1B:
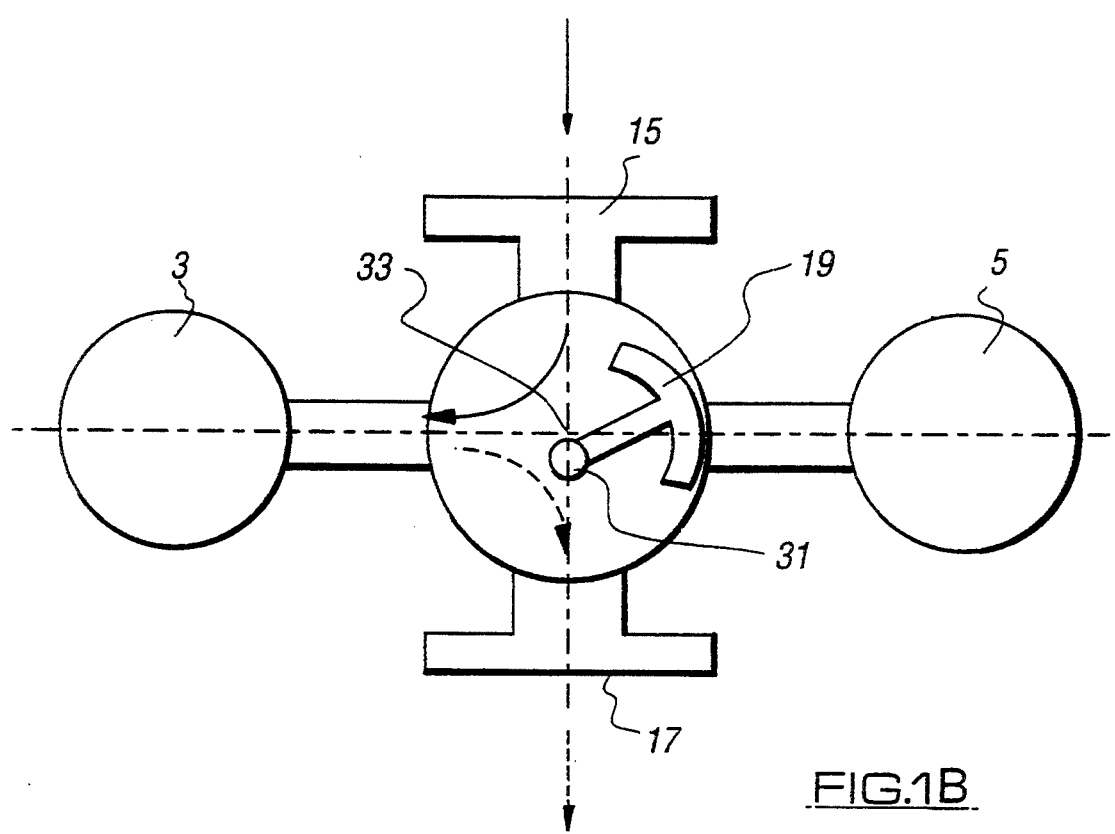
FIG. 1B is a schematic plan view of the apparatus shown in FIG. 1A.

With the member in the first sealing position shown in FIGS. 1A and 1B, the seals 21, 23 are sealed against the inlet 7b and outlet 9b of chamber 5 so that fluid entering the inlet port 15 is constrained to flow through chamber 3, filter 11a, and through outlet port 17.

Figure 2A:
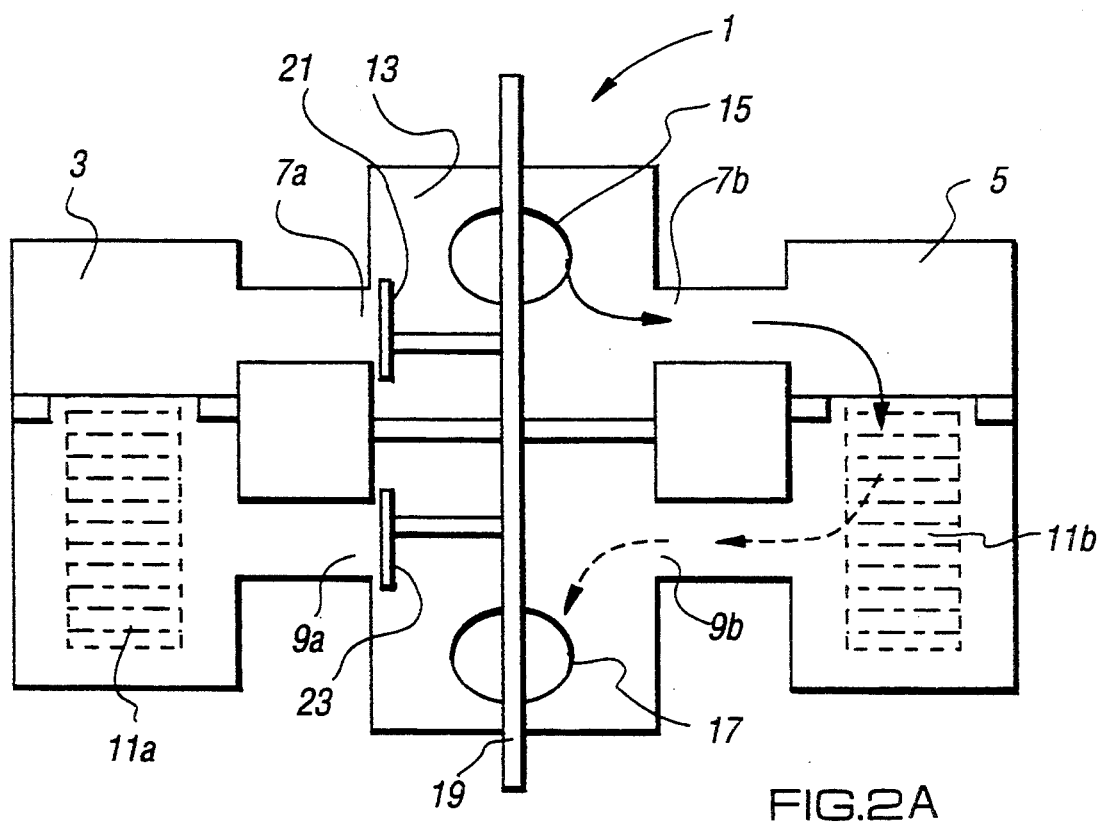
FIG. 2A is a view similar to the view of FIG. 1A but in a second sealing position.
Figure 2B:
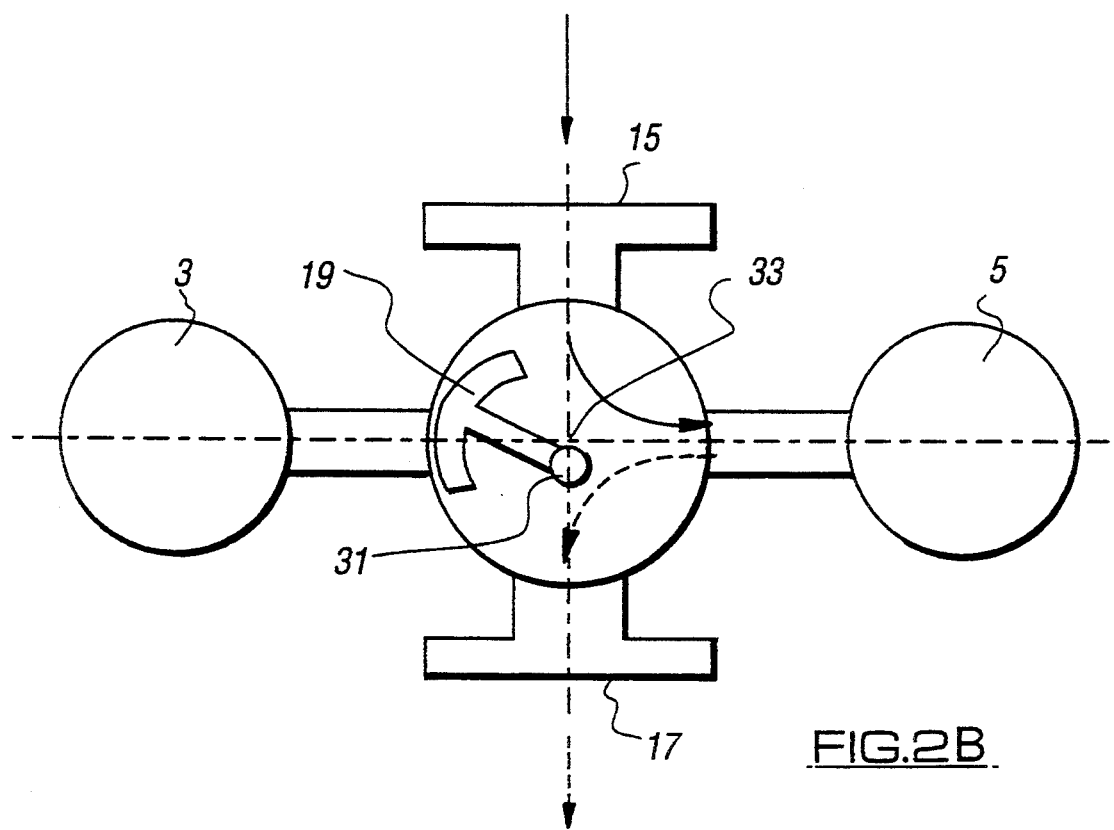
FIG. 2B is a view similar to the view of FIG. 1B but in a second sealing position.

FIGS. 2A and 2B illustrate the member 19 in a second sealing position in which fluid is constrained to flow through chamber 5 and filter 11b.

With member 19 in the first sealing position, chamber 5 is sealed off from the flow of fluid, enabling the filter 11b to be removed for cleaning or replacement, and chamber 3 is sealed off from the fluid flow when the member 19 is in the second sealing position. When the member 19 is between the first and second sealing positions, the inlet and outlet 7a,9a,7b,9b to each chamber 3,5 is at least partially open for fluid to flow therethrough, thereby ensuring that there is no interruption to the fluid flow through the apparatus at any time.

Figure 3:
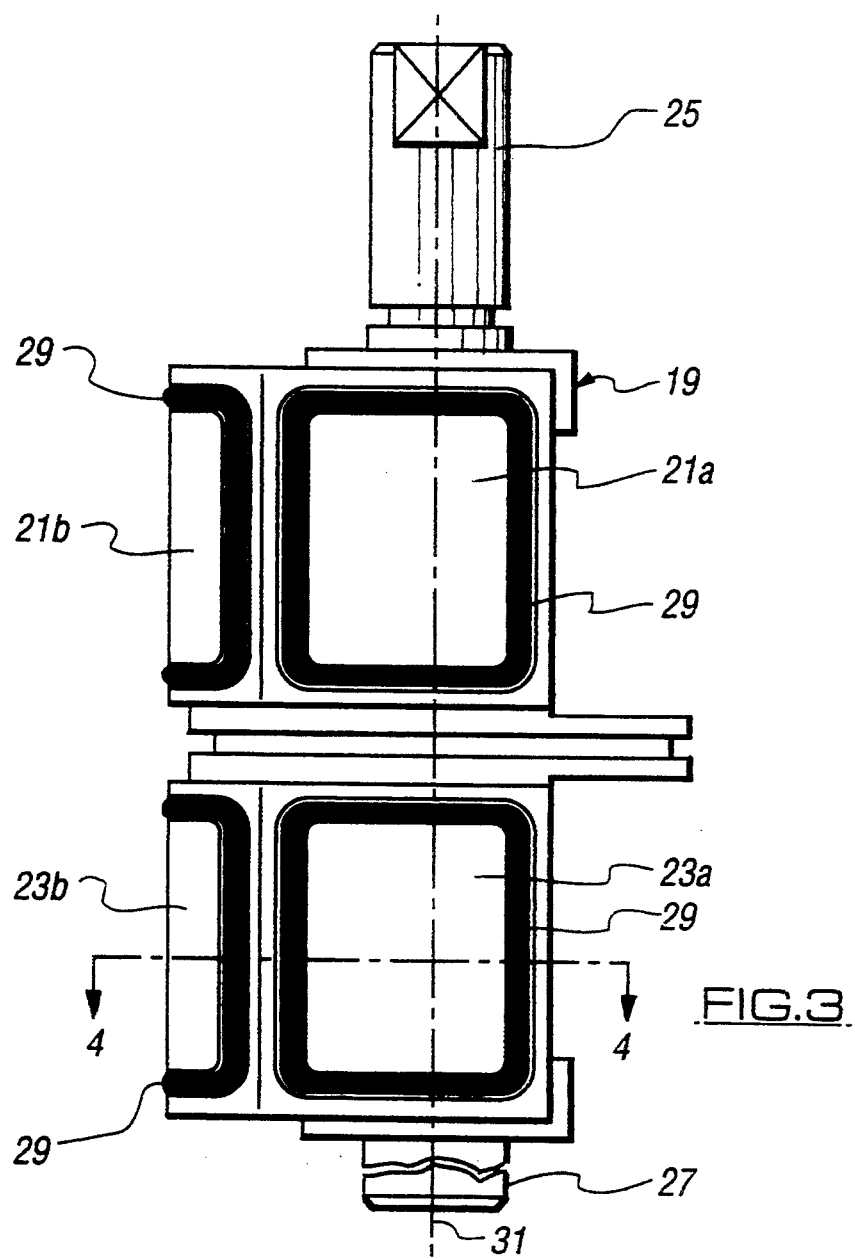
FIG. 3 is an elevation view of the pivotable member forming part of the apparatus in accordance with the invention.
Figure 4:
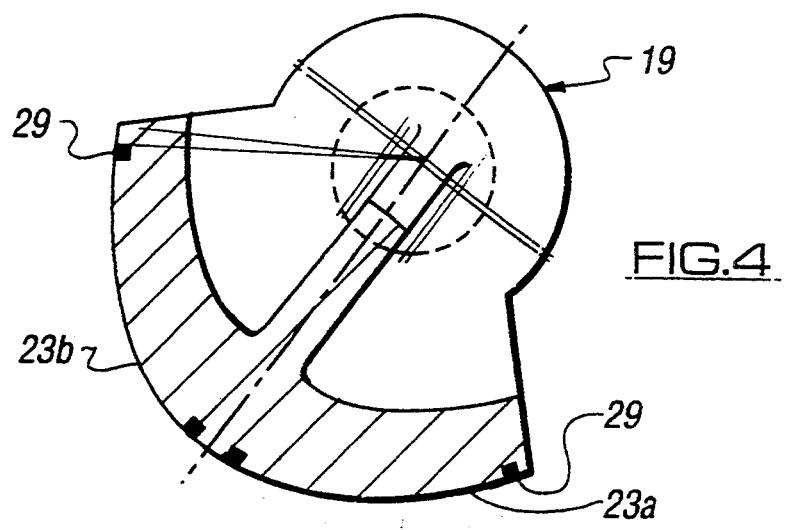
FIG. 4 is a view along the line 4—4 of FIG. 3.
Figure 5:
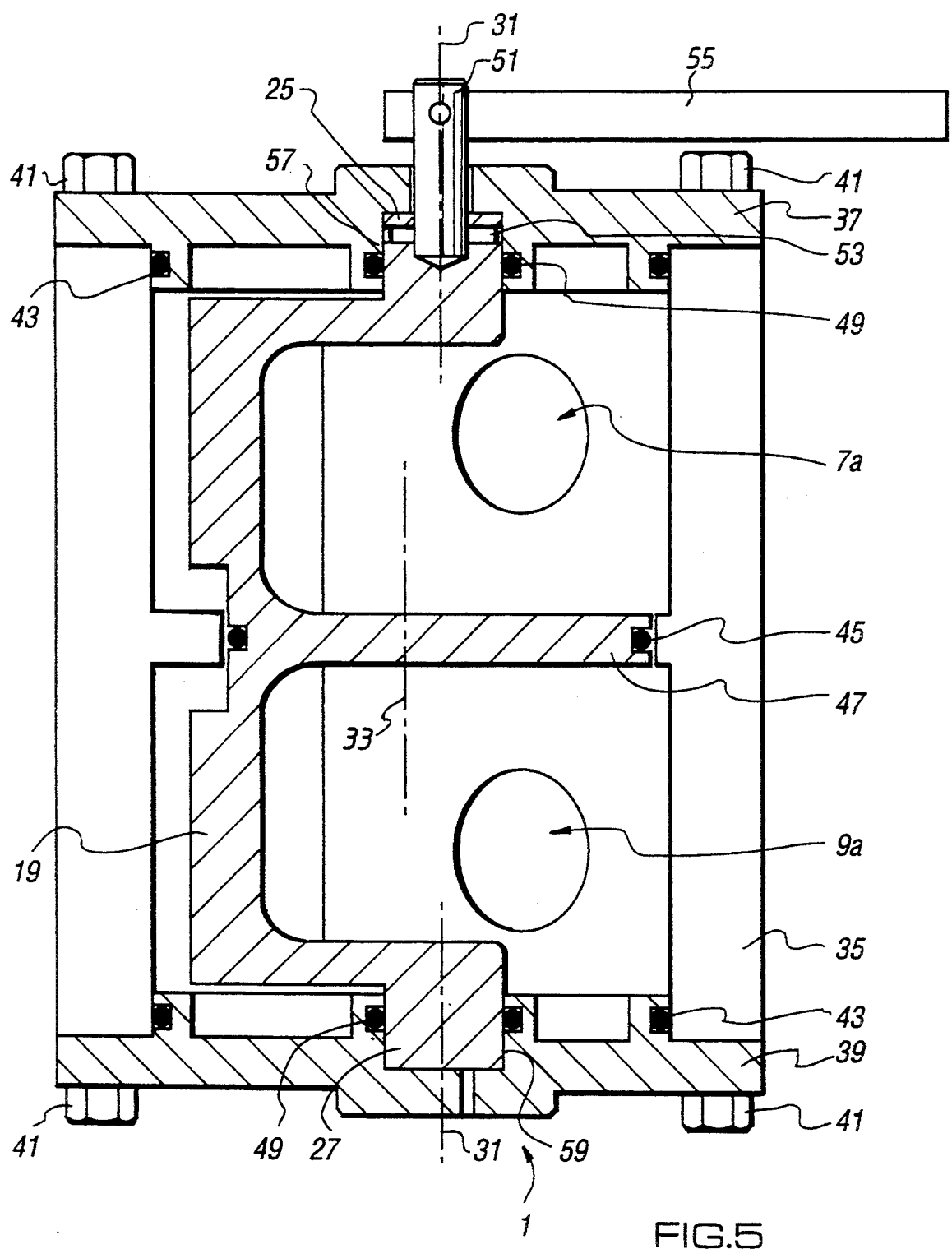
FIG. 5 is an elevation view in cross section of an apparatus in accordance with the invention.

The member 19 shown in FIGS. 3 and 4 is mounted so as to pivot about two plug axles 25,27 about a pivot axis 31 within a cylindrical central chamber (see FIG. 5). The inlet and outlet seals 21,23 comprise cylindrical sealing faces 21a,21b,23a,23b, the radii of which are the same as the radius of the central chamber 13. The pivot axis 31 is parallel to but spaced from the longitudinal axis 33 of the central chamber 13 (i.e. the member 19 is mounted eccentrically in the chamber 13), and the longitudinal axes of each of the sealing faces are parallel to but spaced from the pivot axis 31 (i.e. the sealing faces are eccentric with respect to the member 19). The arrangement is such that, with the member 19 in the first sealing position (shown in FIG. 1A) the longitudinal axes of sealing faces 21a and 23a are coaxial with the axis 33 of the central chamber 13, and the inlet 7a and outlet 9a to chamber 3 are effectively sealed by sealing faces 21a and 23a.

The sealing faces 21a,21b,23a,23b are shown as being integral to the member 19; the sealing faces could equally be manufactured as separate components which may be releasably mounted to the member, by bolts, for example (not shown). Such separate sealing faces could be more easily manufactured.

When the eccentrically mounted member 19 is rotated about the axis 31, each seal face moves through an arcuate path towards the respective inlet or outlet with a gradually reducing clearance therebetween, until the seal faces mate against the wall of the central chamber 12, simultaneously sealing off the inlet and outlet to one or other chamber 3,5. At the point of contact between a sealing face and the respective inlet or outlet there is a small degree of relative sliding movement therebetween, which sliding acts to wipe clean any debris from the mating surfaces to provide a good seal.

A further advantage of the eccentric seal faces is that when the member is rotated away from a sealing position there is an increasing clearance within the wall of the chamber 13, thereby avoiding any interruption to the flow.

The perimeter of each sealing face is provided with an 'O' seal 29 such as a soft seal or a bonded seal, seated in a slot with a reverse taper, so as to improve the seal between a sealing face and the respective inlet or outlet. The sliding movement between the 'O' seals 29 and the wall of the central chamber around the inlet or outlet acts to remove any debris and continued motion ensures correct energising of the 'O' seal 29, thereby ensuring a good seal. Alternatively, the 'O' seals 29 could be located in slots in the wall of the central chamber 13 surrounding each inlet and outlet.

The method of energizing the 'O' seals 29 around each inlet or outlet provides a positive locking feature. Where the fluid flow is under pressure, once there is a sufficient pressure difference between the central chamber 13 and whichever chamber 3 or 5 has been sealed, as, for example, when that chamber is opened to gain access to the filter 11 it is then impossible to pivot the member 19, or to actuate the valve, until the pressure differential is removed, by repressurising the sealed chamber. Means (not shown) are provided to repressurise both chambers as and when necessary; if the fluid is a liquid, this may conveniently comprise a pipe with a valve connecting the two chambers 3 and 5, and air vents (not shown) may be provided in each chamber.

Where the fluid is a gas, further means (not shown) may be provided to purge each chamber 3,5 of air which might contaminate the gas.

The central chamber 13 may be easily manufactured as a machined cylindrical body 35 (see FIG. 5) with a top cover 37 and a bottom cover 39 attached thereto by bolts 41. The seal between the covers 37,39 and the body is provided by further 'O' ring seals 43. The member 19 pivots about stub axles 25, 27 which seat bearing recesses 57,59 formed in the top and bottom covers 37,39 and are sealed by further 'O' ring seals 49. The outer ends of the stub axles 25,27 are open to atmospheric pressure, and the are of equal diameter. With such an arrangement, the pivot member 19 is effectively hydraulically balanced along its longitudinal axis 31 so that expensive thrust bearings are not required. If there is an appreciable pressure differential between the fluid entering through inlet port 15 and fluid exiting through outlet port 17, the stub axles could be made of different diameters so as to retain the hydraulic balancing effect.

A handle 55 may be fixed by a shaft 51 and locking pin 53 to one of the stub axles 25 so that the valve may be operated manually, or means (not shown) may be provided so as to operate the valve automatically. However the valve is operated, the sealing or opening of the fluid path through each of the chambers 3,5 is effected simultaneously.

The member 19 is formed with a circular division seal plate 47 which is coaxial with a portion of the cylindrical central chamber 13, so as to ensure that fluid flows through either or both the chambers 3,5 but not directly between the inlet and outlet parts 15,19. An 'O' ring seal 45 may be provided to improve the seal between the division plate 47 and the central chamber 13.

Whilst the embodiment described above concerns the diversion of fluid from between two paths, three or more chambers could be provided and the pivoting member given an equivalent number of pairs of inlet and outlet sealing faces. With such an arrangement it would be possible to seal off one chamber at a time whilst permitting fluid to flow through the remaining chambers.

We claim:

1. Apparatus for diverting the flow of a fluid between a first flow path and a second flow path, each flow path having an inlet and an outlet, said apparatus comprising
    a valve member to which are mounted plural valve sealing faces, each valve face being adapted to seal against one of an inlet and an outlet for each of said flow paths, said valve member being movable on a pivot axis between a first position in which both said inlet and outlet of said first path are sealed against fluid flow and both said inlet and outlet of said second path are open to fluid flow, and a second position in which both said inlet and outlet of said first path are open to fluid flow and both said inlet and outlet of said second path are sealed against fluid flow, movement of said valve member effecting sealing and opening said inlet and outlet of each respective flow path substantially simultaneously, both said flow paths being at least partially open to fluid flow when said valve member is between said first and second positions,
    a housing within which said valve member is pivotally mounted, said housing defining a cylindrical wall with a longitudinal axis, said valve member being mounted so that its pivot axis is parallel to, but not coincident with, said longitudinal axis of said cylindrical wall,
    a separate port formed in said cylindrical wall of said housing to define said inlet and said outlet for each of said first and second paths, and
    a port sealing face defined on said cylindrical wall around each said port, each valve sealing face having a radius substantially equal to the radius of said cylindrical wall, and each port sealing face being adapted to sealingly cooperate with a valve sealing face.

2. Apparatus as claimed in claim 1, said valve sealing faces each being of a cylindrical configuration, the longitudinal axes of said valve sealing faces being parallel to, but not coincident with, the pivot axis of said valve member.

3. Apparatus as claimed in claim 2, the longitudinal axes of said valve sealing faces for sealing the inlet and outlet to each said path being coaxial one with the other.

4. Apparatus as claimed in claim 2, said cylindrical wall of said housing having a substantially constant radius.

5. Apparatus as claimed in claim 2, said apparatus comprising
    structure defining a groove around at least one of the periphery of each valve sealing face and the periphery each port, and
    a soft seal mounted in each of said grooves to enhance the seal established between each valve sealing face and its associated port.

6. Apparatus as claimed in claim 2, said apparatus comprising
    coaxial stub shafts having ends that extend through said housing, said valve member being mounted within said housing to said stub shafts.

7. Apparatus as claimed in claim 2, said apparatus comprising
    means to relieve fluid pressure within each path when said inlet and outlet to that path is sealed, and
    means to empty fluid from each path so as to allow access into that path.

8. Apparatus as claimed in claim 7, said apparatus comprising means to refill each path with pressurized fluid.

9. Apparatus as claimed in claim 7, said apparatus comprising filter means in located in at least one of said paths.

10. Apparatus as claimed in claim 2, said valve sealing faces being integral with said valve member.

* * * * *